United States Patent
Pawelski (10) Patent No.: US 9,204,130 B2
(45) Date of Patent: Dec. 1, 2015

(54) METHOD AND SYSTEM FOR CREATING A THREE DIMENSIONAL REPRESENTATION OF AN OBJECT

(71) Applicant: Caterpillar Inc., Peoria, IL (US)

(72) Inventor: Paul C. Pawelski, Griffin, GA (US)

(73) Assignee: Caterpillar Inc., Peoria, IL (US)

( * ) Notice: Subject to any disclaimer, the term of this patent is extended or adjusted under 35 U.S.C. 154(b) by 439 days.

(21) Appl. No.: 13/760,355

(22) Filed: Feb. 6, 2013

(65) Prior Publication Data

US 2014/0218477 A1    Aug. 7, 2014

(51) Int. Cl.
H04N 13/02    (2006.01)

(52) U.S. Cl.
CPC ........ H04N 13/0253 (2013.01); H04N 13/0203 (2013.01)

(58) Field of Classification Search
CPC . H04N 13/0275; H04N 13/02; H04N 13/025; H04N 13/0235; H04N 13/0271; H04N 13/0253; G06T 7/00; G06T 2207/10024; G06T 2207/10016; G06T 7/0057
USPC .......................................... 348/46, 48, 50, 51
IPC ....................................................... H04N 13/02
See application file for complete search history.

(56) References Cited

U.S. PATENT DOCUMENTS

| | | | |
|---|---|---|---|
| 6,341,016 B1 | 1/2002 | Malione | |
| 7,813,581 B1* | 10/2010 | Fitzpatrick et al. | 382/260 |
| 2004/0128102 A1 | 7/2004 | Petty et al. | |
| 2008/0218610 A1* | 9/2008 | Chapman et al. | 348/246 |
| 2010/0315422 A1 | 12/2010 | Andre et al. | |
| 2011/0050859 A1 | 3/2011 | Kimmel et al. | |
| 2013/0095920 A1* | 4/2013 | Patiejunas et al. | 463/31 |

* cited by examiner

*Primary Examiner* — Trang U Tran (57) ABSTRACT

A method and a system for creating three dimensional representation of an object are provided. The method includes projecting a pattern image comprising one or more pattern elements and capturing an image of the object with the pattern image projected onto the object. The method includes extracting intensity values corresponding to at least two color components of each pixel of the captured image. For each color component, a probability map is generated using the corresponding intensity values. The probability map for a color component represents a probability that a pixel of the captured image is representing a part of a pattern element. A joint probability distribution is determined by combining the probability maps. Using the joint probability distribution, specific pattern elements are located in the captured image. The method includes determining three dimensional coordinates representing points on surface of the object based on the location of the specific pattern elements.

16 Claims, 5 Drawing Sheets

METHOD AND SYSTEM FOR CREATING A THREE DIMENSIONAL REPRESENTATION OF AN OBJECT

TECHNICAL FIELD

The disclosure relates to optical measurement methods for modeling of an object, and more particularly, to method and system for creating a three dimensional model of the object.

BACKGROUND

Three dimensional modeling of objects typically involve measurement of data points on the surface of the object in all three dimensions. A mechanical measurement method may be employed for this purpose. In one such method, a small probe is lowered in the vertical direction until it makes contact with the surface of the object. X, Y and Z coordinates corresponding to the contact point are recorded. The probe is then raised in the vertical direction and indexed in the horizontal direction. The probe is lowered again and the process is repeated. Although this method provides accurate results, it is not generally preferred for making 3D models due to the slow speed of the process.

To overcome the speed limitations of the mechanical measurement methods, optical measurement methods may be employed. Several known optical measurement methods for creating a 3D model involve projecting a pattern image on a 3D object and measuring the distortion of the pattern image. One such method uses a projector to project multiple pattern images onto the object. The pattern images are typically either a set of sinusoidal gray scale patterns or a set of black and white patterns. The patterns vary in only one direction so that brightness measurements on a given line perpendicular to the direction of variation are consistent when the pattern image is projected on a constant color plane. A camera records photographs of the object with each of the pattern images projected onto the object. A computer estimates the 3D shape of the object by observing the deviations in brightness perpendicular to the direction of variation of pattern image. However, this method works best with a consistently colored, non-reflective, opaque surface in dim light conditions.

Thus there is a need for a method and a system for creating a three dimensional model of the object in an improved manner.

SUMMARY

In one aspect, present disclosure provides a method for generating a three dimensional (3D) representation of an object. The method includes projecting a pattern image on the object wherein the pattern image comprises one or more pattern elements. The method further includes capturing an image of the object with the pattern image projected onto the object. The method includes extracting intensity values corresponding to at least two color components of each pixel of the captured image. The method includes generating a probability map for each color component using the corresponding extracted intensity values, wherein the probability map for a color component represents a probability that a pixel of the captured image is representing a part of a pattern element. Further, a joint probability distribution is determined using the probability maps for the color components, the joint probability distribution representing a probability that a pixel of the captured image is representing part of any pattern element. Using the joint probability distribution, specific pattern elements are located in the captured image. Finally, the method includes determining three dimensional coordinates representing points on surface of the object based, at least in part, on the location of the specific pattern elements. A point cloud of three dimensional coordinates representing the surface of the object may be generated.

In another aspect, the present disclosure provides a system for generating the 3D representation of the object. The system includes a projector, an image capturing module, and a controller. The projector is configured to project a pattern image on the object, the pattern image comprising one or more pattern elements. The image capturing module is configured to capture an image of the object with the pattern image projected onto the object. The controller is coupled to the image capturing module and the projector. The controller through a combination of hardware and software is able to extract intensity values corresponding to at least two color components of each pixel of the captured image, and perform mathematical manipulation on the image data. The mathematical manipulation of the image data may include, but is not limited to, pixel by pixel subtraction of the intensity values of color components in one image from the corresponding data in another image, probabilistic calculations to determine the likelihood that a given pixel of the captured image is representing part of a pattern element, probabilistic pattern recognition on clusters of pixels to determine the likelihood that the pixels recorded a particular part of the pattern element, and comparison of the combined probabilistic results to a lookup table or formula to determine the most likely three dimensional location of the portion of the object that reflected the part of the pattern element.

Other features and aspects of this disclosure will be apparent from the following description and the accompanying drawings.

DETAILED DESCRIPTION

Figure 1:
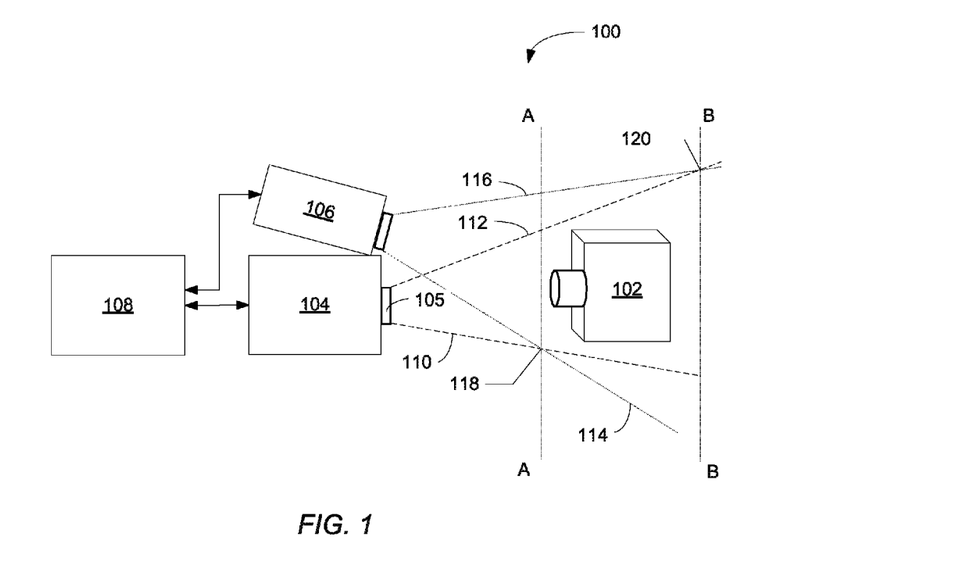
FIG. 1 illustrates an exemplary environment having a controller for generating a three dimensional (3D) representation of an object, and including image planes AA and BB, according to one embodiment of the present disclosure.

FIG. 1 shows an exemplary environment 100 in which the present disclosure may be utilized. The environment 100 includes at least one object 102, at least one projector 104, at least one image capturing module 106, and at least one controller 108. The object 102 to be scanned may be a rigid or a non-rigid three dimensional (3D) object. The projector 104 may include a source of radiant energy, which is transmitted through a pattern and preferably focused onto the object 102 by means of a lens 105. Various types of full color projectors may be utilized. In one embodiment, the projector 104 is a liquid crystal display (LCD) projector.

As shown in FIG. 1, the object 102 is illuminated with radiant energy from the projector 104. More specifically, the projector 104 may project a pattern image, including, but not limited to, an array of dots, an array of rectangles, an array of stripes, a grid or any other repeating or non-repeating pattern graphic on the object 102. A pattern image comprised of alternating rows of dots and crosses is used in the present disclosure to describe various embodiments of the invention. In an embodiment, the projector 104 may sequentially project the same pattern image in different colors on the object 102. As an example, the pattern image may be colored red in the first projection, green in the second projection, and blue in the third projection. When the pattern image is projected onto the object 102, it is distorted by the surface of the object 102.

In some embodiments, the projector 104 may project a blank image without a pattern onto the object 102. Specifically, the blank image is projected onto the object 102 with only the minimum illumination that is possible for the projector 104 to project an image. It should be understood that even when the projector 104 is projecting the blank image, there may be other light sources (not shown) that are illuminating the object 102.

The image capturing module 106 captures one or more images of the illuminated object 102. The image capturing module 106 may include a camera, a complementary metal oxide semiconductor (CMOS) based sensor or any other type of two dimensional (2D) image sensor array that can capture full color images. In one embodiment, the image capturing module 106 is a charge coupled device (CCD) camera. Depending on the surface of the object 102, the captured images may be distorted compared to the pattern image projected on the object 102. Thus, the captured images provide information about the surface of the object 102 that caused the distortion. It should be understood that objects having flat reflective surfaces, such as a matt white plane may, at particular angles relative to the projector 104 and image capturing module 106, provide an undistorted image. On the other hand, objects at other angles, having curved surfaces or having many faceted surfaces, may reflect a distorted image altered by the surface of the object 102 to the image capturing module 106. A person having ordinary skill in the art will appreciate that even small surface irregularity may become large distortions in the captured image.

Optionally, the image capturing module 106 may be fixedly mounted using a camera tripod, framework, or other mounting means known in the art. Moreover, the image capturing module 106 may be provided with an arrangement to capture multiple images of the object 102 from different angles. Environment 100 may optionally include a mount coupled to the projector 104 and the image capturing module 106 so as to hold the image capturing module 106 in a fixed spatial relation to the projector 104. In one embodiment, a time at which the projector 104 projects the pattern image on the object 102 and a time at which the image capturing module 106 captures the image of the object 102 may be synchronized. A timer may be provided in the environment 100 to enable the synchronization between the image capturing module 106 and the projector 104.

Referring to FIG. 1, a lower edge 110 and an upper edge 112 of a field of projection of the projector 104 and a lower edge 114 and an upper edge 116 of a field of view of the image capturing module 106 are shown. The lower edge 110 of the field of projection of the projector 104 may intersect with the lower edge 114 of the field of view of the image capturing module 106 at a point 118 in the plane AA in front of the projector 104. The upper edge 112 of the field of projection of the projector 104 may intersect with the upper edge 116 of the field of view of the image capturing module 106 at a point 120 in the plane BB in front of the projector 104. In this arrangement, a region bounded by the lower edge 110 and upper edge 112 of the field of projection, the lower edge 114 and the upper edge 116 of the field of view, and the planes AA and BB defines the region where the object 102 will be illuminated by the projector 104 and the reflected image will be captured by the image capturing module 106. It should be understood that both field of view of the image capturing module 106 and field of projection are conical so the shape of the region is actually the intersection of the two cones.

In the present disclosure, the controller 108 is coupled to the image capturing module 106. The controller 108 may be a personal computer, a microcontroller, or any other digital or analog system that can connect to the image capturing module 106, store image information form the image capturing module 106 in a lossless pixel by pixel format and perform mathematical operations on the stored image information. The controller 108 receives the images from the image capturing module 106. Further, the controller 108 processes the received images to generate the 3D representation of the object 102. The images (and all images referenced herein) may be saved as digital files in the controller 108. The controller 108 is also coupled to the projector 104. The controller 108 may provide signals to the projector 104 to control the projection sequence of the pattern images on the object 102.

Upon receiving the captured image from the image capturing module 106, the controller 108 extracts information related to at least two color components of each pixel of the captured image. In various embodiments, the color components may be determined using one of a RGB color model or a CMYK color model. RGB color model is used in the present disclosure to describe various embodiments of the invention. The controller 108 may extract intensity values corresponding to RGB color components of each pixel of the captured image. Use of at least two of the RGB intensity values of each pixel of the captured image in calculating the probability of recording a pattern element from the pattern image results in more accurate data for generating 3D representation of the object 102. In an example embodiment, each pixel may be assigned 24 bits to represent its intensity and/or color. These 24 bits may include 8 bits for red, 8 for green and 8 for blue. In integer format, 8 bit numbers range from 0 to 255. Thus, intensity values may be defined as a triplet of the form (Red, Green, Blue) where (255,0,0) is red, (0,255,0) is green and (0,0,255) is blue. It should be understood that the intensity of the light received also affects the triplet value recorded. For example, low light level red might be (15,0,0) while high light level red will have green and blue components, for example (255,70,70). In addition, the color of the object 102 will affect the value recoded. For example, red projected on a green surface might be (255,180,0). In an embodiment, the controller 108 may perform pre-processing of the extracted information prior to subsequent probabilistic analysis.

As discussed earlier, the projector 104 may also project a blank image where each projected pixel is black (0,0,0). A reference image is captured by the image capturing module 106 corresponding to the projection of the blank image. The reference image will in most cases not have every pixel as black due to ambient lighting conditions and system noise. A component image is generated by doing a pixel by pixel subtraction of the reference image from the captured image taken when a pattern image is projected. All further analyses are performed on the component image resulting in more accurate identification of pattern elements of the pattern image.

Using the extracted intensity values, the controller 108 generates a probability map of the likelihood that a pixel of the captured image is part of any pattern element from the pattern image.

Figure 2:
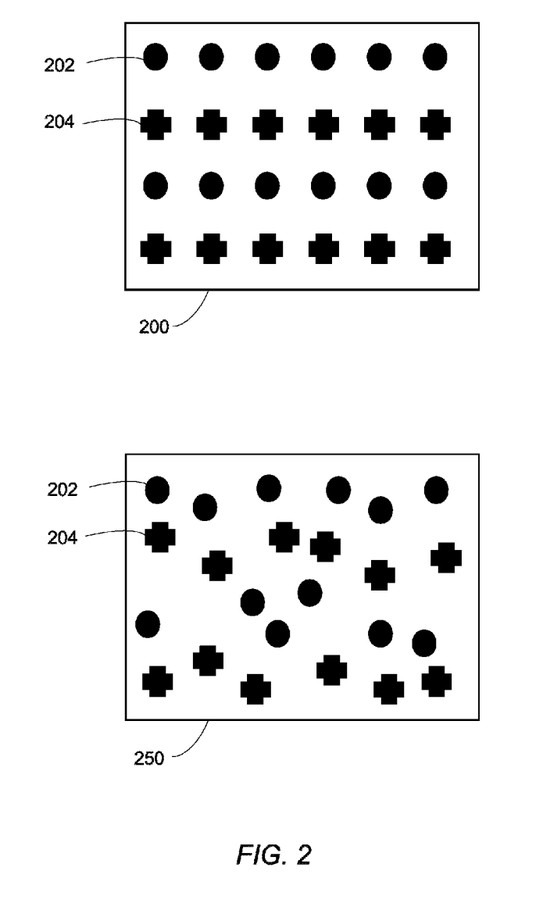
FIG. 2 illustrates a projected pattern image and a captured image in one possible embodiment.

Referring to FIG. 2, an example pattern image 200 that can be projected by the projector 104 in various colors is shown.

The pattern image 200 comprises pattern elements which for exemplary purposes in the present disclosure are alternating rows of dots 202 and crosses 204. An example image 250 is captured by the image capturing module 106 after the pattern image 200 is reflected from the object 102. For clarity, only the pattern elements 202 and 204 are shown. It should be understood that an actual captured image will have variations in brightness and colors of other pixels in addition to the pixels that record the pattern elements 202 and 204. Note how the positions of the pattern elements 202 and 204 have shifted in the captured image 250 relative to their positions in the pattern image 200. This is due to variations in the distance of the surfaces of the object 102 that reflected each element.

Figure 3:
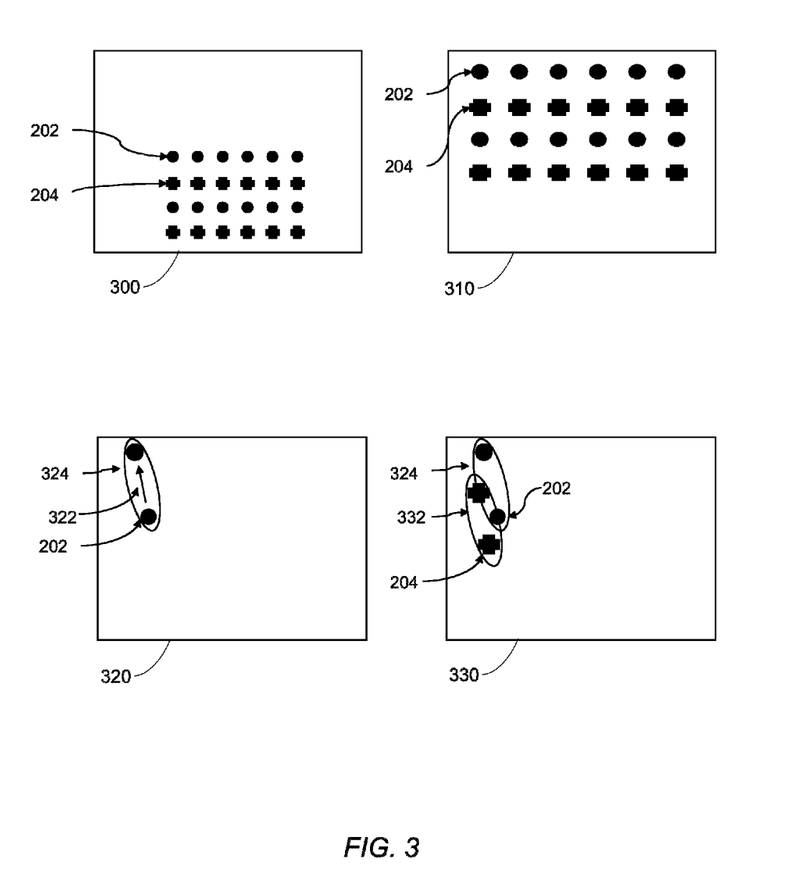
FIG. 3 illustrates how elements of a projected pattern image may change position in the captured image in one possible embodiment; and FIG. 4a and FIG. 4b illustrates a flowchart of a process for generating the 3D representation of the object.

A first image 300, shown in FIG. 3, is captured by the image capturing module 106 when the pattern image 200 is projected on a smooth planar surface located in plane AA. FIG. 3 also shows a second image 310 which is captured by the image capturing module 106 when the pattern image 200 is projected on a smooth planar surface located in plane BB. Note how the pattern elements 202 and 204 change both in their locations in the first image 300 and the second image 310 as well as in their positions relative to each other. It should be understood that the first image 300 and the second image 310 are only examples and that the relative position and angle of the projector 104 to the image capturing module 106 as well as the optics used by the projector 104 and the image capturing module 106 will affect the captured image. However, the effects of relative position, angle, and optics are predictable, measurable, and repeatable.

Image 320 shows the transition of the pattern element 202 which has been isolated and its position in the second image 310 is overlaid on its position in the first image 300. If the object 102 has a flat planar surface and is moved from plane AA to plane BB, the location of the pattern element 202 changes in the captured image as shown by the arrow 322. A first area 324 encompasses the region of the captured image where it is possible for the pattern element 202 to be seen in the captured image. Further, location of the pattern element 202 within the first area 324 indicates the location of the part of the surface of the object 102 that reflected the pattern element 202.

Image 330 shows the pattern element 204 which has been isolated and its position in the second image 310 is overlaid on its position in the first image 300. A second area 332 encompasses the region of the captured image where it is possible for the pattern element 204 to be seen in the captured image. Note how the second area 332 overlaps the first area 324.

The controller 108 further takes into account how the elements of the pattern image are offset relative to the field of view and relative to other elements of the projected image in the captured image. The amount of offset depends, in addition to other parameters, on the distance of the surface of the object 102 reflecting the element from the projector 104. As the distance of the surface of the object 102 reflecting the element from the projector 104 varies, the position of the element in the captured image also varies.

In various embodiments, the controller 108 may include a computer system. The computer system may typically include one or more processing units (CPUs), one or more network or other communications interfaces (e.g., antennas, I/O interfaces, etc.), memory, and one or more communication buses for interconnections. The communication buses may include circuitry that interconnects and controls communications between various components of the computer system.

Figure 4A:
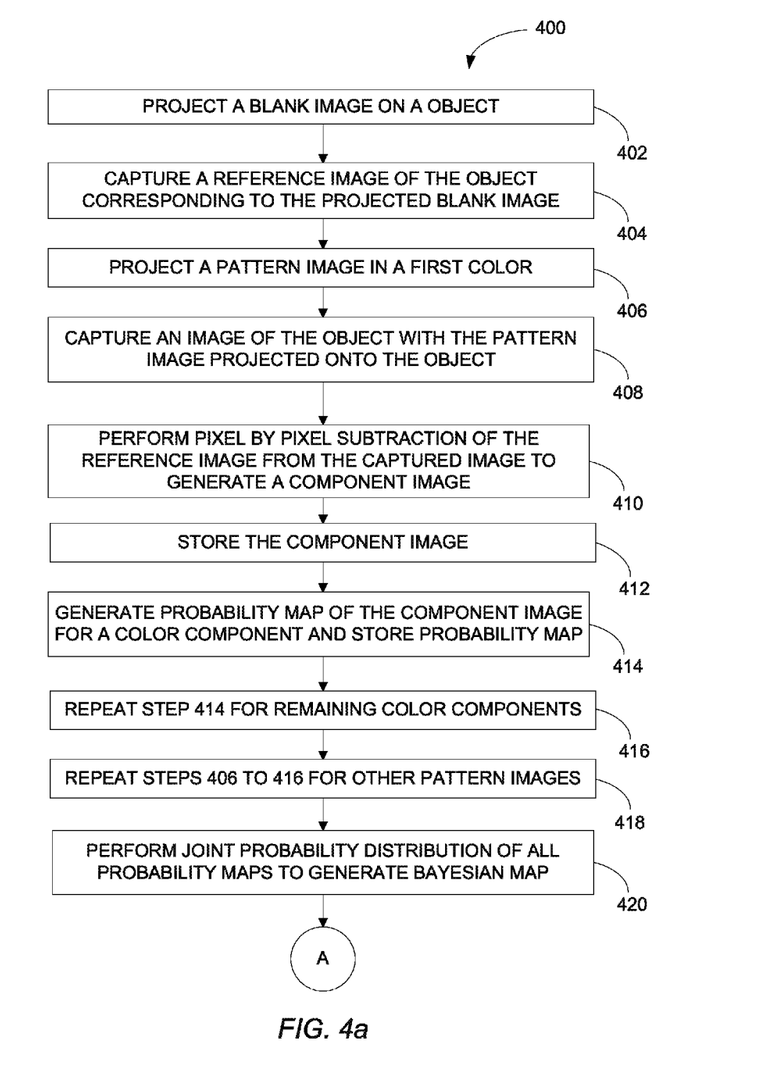
Figure 4B:
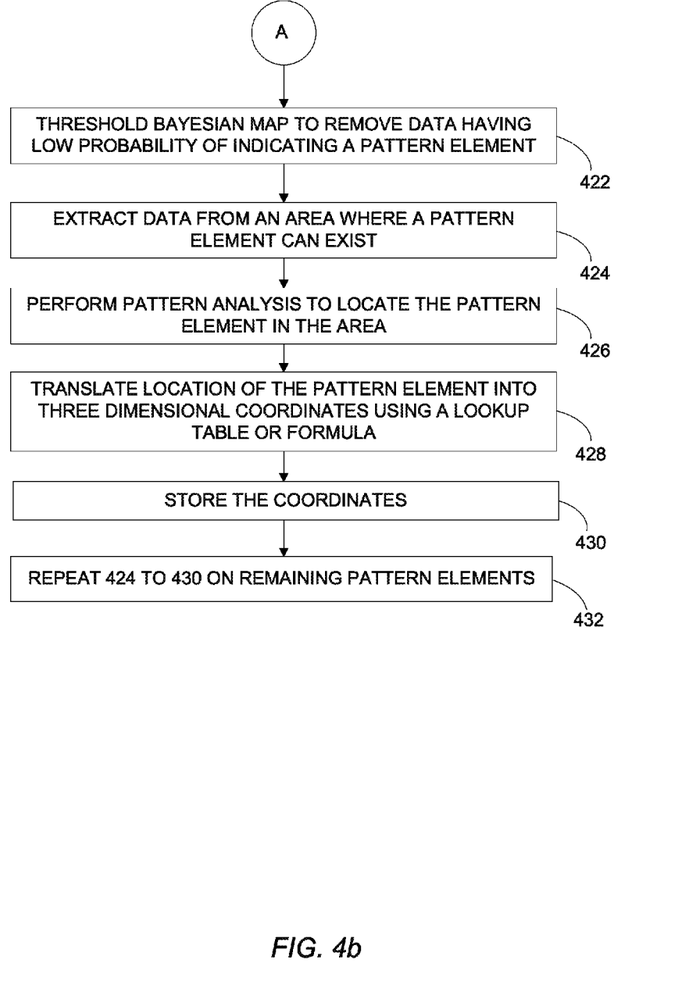

FIG. 4 illustrates a flowchart of a process 400 for generating the 3D representation of the object 102. The steps in this flowchart will be described in detail in the Industrial Applicability section which follows. In some embodiments, the steps of the flowchart may be performed by a computer system including a non-transitory, tangible computer readable medium having instructions stored thereon that, in response to execution by the computer system, generates three dimensional representation of the object 102.

INDUSTRIAL APPLICABILITY

Known methods of creating a 3D model involve measuring data points on the surface of the object 102 in all three dimensions. Some of these methods involve mechanical arrangements for obtaining information about data points on the surface of the object 102. However, the mechanical measurement methods are time consuming.

The present disclosure relates to creating the 3D representation by utilizing optical measurements to obtain information related to the object 102. As described above, the environment 100 includes the projector 104, the image capturing module 106 and the controller 108.

FIG. 4a and FIG. 4b illustrates a flowchart of a process 400 for generating the 3D representation of the object 102. At step 402 in FIG. 4a, a blank image is projected by the projector 104. In step 404, the image capturing module 106 captures a reference image corresponding to the projection of the blank image. The reference image is stored in memory of the controller 108. The storage is done in a lossless pixel by pixel format which stores the intensity values of each of the color components of each pixel.

In step 406, the projector 104 projects a pattern image comprising the pattern elements of a first color. The image capturing module 106 in step 408 captures an image of the object 102 with the pattern image projected onto the object 102. The controller 108 in step 410 performs a pixel by pixel subtraction of the reference image from the captured image to generate a component image. In step 412, the component image created by this subtraction is stored.

In step 414, a probability map of the component image based on first primary color is generated by the controller 108 and stored in memory. The probability map is created by taking the actual intensity value of a color component recorded at each pixel and subtracting it from the intensity value of the corresponding color component of the projected image. The absolute value of this number is then divided by the total number of color gradations that can be recorded to get a percentage. Finally, this percentage is divided by two. This final operation is mathematically equivalent to performing a Bayesian joint probability distribution of the probability with a preexisting condition that there is an even chance (50%) that any given pixel could have captured a part of the projected image. As an example, if the projected color is yellow which has the red, green, blue triplet of (255,255,0) and the red intensity captured by a particular pixel is 150, the probability that the pixel has captured part of the pattern element is ABS(255−150)/256/2=0.2051. Step 416 indicates that the process in step 414 is repeated for all the remaining color components.

Step 418 indicates that steps 406 through 416 are repeated for the same pattern image projected in different colors. In an example, three pattern colors are used resulting in a total of nine probability maps which are stored in the controller 108 once step 418 is completed.

In step 420, a joint probability distribution of all probability maps stored in step 418 is performed to get Bayesian map.

The Bayesian map indicates the probability at each pixel, based on all three primary colors that the pixel has captured a part of the pattern element.

In step 422 shown in FIG. 4b, a threshold is applied to the Bayesian map to remove data that has a low probability of indicating a pattern element. This makes it easier for the pattern analysis in step 426 to identify pattern elements by removing statistical noise.

Step 424 involves extracting data from the area where first pattern element can exist. By doing the subsequent steps on only the identified area, the processing time for the pattern analysis to locate the pattern element in step 426 is reduced.

Once the pattern element has been located, step 428 translates the pattern element location into X, Y, & Z spatial coordinates. In step 430, the three dimensional coordinates are stored in the memory.

Step 432 indicates that steps 424 through 430 are repeated on the remaining pattern elements. The result is a point cloud of X,Y,Z coordinates that are on the surface of the object 102. This point cloud may be exported as a data file to other commonly available software such as Mesh Lab or may be further processed to create a surface model of the object 102 which can then be exported in a common 3D model format such as STL or OBJ.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method comprising:
projecting a pattern image on an object by a projector, the pattern image comprising one or more pattern elements;
capturing an image of the object with the pattern image projected onto the object;
extracting intensity values corresponding to at least two color components of each pixel of the captured image;
generating a probability map for each color component using the corresponding extracted intensity values, the probability map for a color component representing a probability that a pixel of the captured image is representing a part of a pattern element;
determining a joint probability distribution using the probability maps for the color components, the joint probability distribution representing a probability that a pixel of the captured image is representing part of any pattern element;
locating specific pattern elements in the captured image using the joint probability distribution; and
determining three dimensional coordinates representing points on surface of the object based, at least in part, on the location of the specific pattern elements.

2. The method of claim 1, further comprising:
projecting a blank image on the object;
capturing a reference image of the object corresponding to the projected blank image;
extracting intensity values corresponding to the at least two color components of each pixel of the reference image; and
generating a component image for each color component by performing pixel by pixel subtraction of intensity values of the reference image from the corresponding intensity values of the captured image, wherein generating the probability map for each color component comprises generating the probability map using intensity values of the component image.

3. The method of claim 1, wherein the color components are obtained using one of RGB color model or CMYK color model.

4. The method of claim 1, wherein the pattern image includes at least one of an array of dots, an array of stripes, an array of rectangles, and a grid.

5. The method of claim 1, wherein a timing associated with the capture of the image is synchronized with a timing associated with the projection of the pattern image.

6. The method of claim 1, wherein the determining the joint probability distribution includes combining the probability maps using Bayesian joint probability distribution.

7. The method of claim 1, wherein the three dimensional coordinates are determined using one of a lookup table or a mathematical formula for translating the location of the specific pattern elements into the three dimensional coordinates.

8. A system for generating a three dimensional (3D) representation of an object, the system comprising:
a projector configured to project a pattern image on an object, the pattern image comprising one or more pattern elements;
an image capturing module configured to capture an image of the object with the pattern image projected onto the object; and
a controller coupled to the image capturing module and the projector, the controller is configured to:
extract intensity values corresponding to at least two color components of each pixel of the captured image;
generate a probability map for each color component using the corresponding extracted intensity values, the probability map for a color component representing a probability that a pixel of the captured image is representing a part of a pattern element;
determine a joint probability distribution using the probability maps for the color components, the joint probability distribution representing a probability that a pixel of the captured image is representing part of any pattern element;
locate specific pattern elements in the captured image using the joint probability distribution; and
determine three dimensional coordinates representing points on surface of the object based, at least in part, on the location of the specific pattern elements.

9. The system of claim 8 further comprising a mount, which is attached to the projector and the image capturing module so as to hold the image capturing module in a fixed spatial relation to the projector.

10. The system of claim 8, wherein the projector is a liquid crystal display (LCD) projector.

11. The system of claim 8, wherein the image capturing module is a charge coupled device (CCD) camera.

12. The system of claim 8, wherein:
the projector is further configured to project a blank image on the object;
the image capturing module is further configured to capture a reference image of the object corresponding to the projected blank image;
the controller is further configured to:
extract intensity values corresponding to at least two color components of each pixel of the reference image; and
generate a component image for each color component by performing pixel by pixel subtraction of intensity values of the reference image from the corresponding intensity values of the captured image, wherein the controller generates the probability map for each color component using intensity values of the component image.

13. The system of claim 8, wherein the projector is configured to project the pattern image including at least one of an array of dots, an array of stripes, an array of rectangles, and a grid.

14. The system of claim 8 further comprising a timer configured to synchronize a timing associated with the capture of the image with a timing associated with the projection of the pattern image.

15. The system of claim 8, wherein the controller is configured to determine three dimensional coordinates using one of a lookup table or a mathematical formula for translating the location of the specific pattern elements into the three dimensional coordinates.

16. The system of claim 8, wherein the controller is configured to determine the joint probability distribution by combining the probability maps using Bayesian joint probability distribution.

* * * * *